United States Patent
Scoca et al.

(10) Patent No.: US 6,804,167 B2
(45) Date of Patent: Oct. 12, 2004

(54) BI-DIRECTIONAL TEMPORAL CORRELATION SONAR

(75) Inventors: Anthony L. Scoca, Hicksville, NY (US); James G. Huber, Babylon, NY (US); Barry S. Schwartz, East Meadow, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/440,524

(22) Filed: May 19, 2003

(65) Prior Publication Data

US 2004/0165479 A1 Aug. 26, 2004

Related U.S. Application Data

(60) Provisional application No. 60/449,402, filed on Feb. 25, 2003.

(51) Int. Cl.[7] ............................................... G01S 15/60
(52) U.S. Cl. ......................................................... 367/89
(58) Field of Search ...................... 367/89, 91; 702/143; 73/597

(56) References Cited

U.S. PATENT DOCUMENTS

| | | | |
|---|---|---|---|
| 4,244,026 A | 1/1981 | Dickey, Jr. .................... | 367/89 |
| 4,391,124 A | 7/1983 | Drost et al. .................... | 367/13 |
| 4,434,648 A | 3/1984 | Drost et al. .................... | 367/13 |
| 4,954,996 A * | 9/1990 | Fazzolari et al. .............. | 367/13 |
| 5,077,700 A | 12/1991 | Shaw et al. .................... | 367/91 |
| 5,315,562 A | 5/1994 | Bradley et al. ................ | 367/89 |
| 5,317,542 A | 5/1994 | Konopelski ................... | 367/12 |
| 5,422,860 A | 6/1995 | Bradley et al. ................ | 367/89 |
| 5,483,499 A | 1/1996 | Brumley et al. .............. | 367/89 |
| 5,615,173 A | 3/1997 | Brumley et al. .............. | 367/90 |

FOREIGN PATENT DOCUMENTS

| JP | 55082067 | 11/1978 | |
|---|---|---|---|
| JP | 62082381 A * | 4/1987 | ........... G01S/15/58 |

OTHER PUBLICATIONS

Keary et al.; A New Correlation Sonar Velocity Sensor (Covelia); Sep. 2001; pp. 1–11.*

* cited by examiner

*Primary Examiner*—Daniel T. Pihulic
(74) *Attorney, Agent, or Firm*—Mark A. Wurm

(57) ABSTRACT

A temporal correlation SONAR calculates the velocity and position of a water navigable craft. A first pulse and a second set of pulses are transmitted towards an ocean bottom. A tetrad of hydrophones on the craft receives echoes of the pulses. A correlation between the first pulse received on one hydrophone with the second pulses received on another hydrophone produces correlation points, for which a correlogram is generated. The distance between the hydrophones is divided by twice the time value at the peak of the correlation to calculate the velocity of the vessel. Another correlation is generated for hydrophones pairs that are positioned diagonally from one another, and maximum correlation values, along with hydrophone angles, are used to calculate athwart-ship velocity.

44 Claims, 4 Drawing Sheets

TEMPORAL CORRELOGRAM

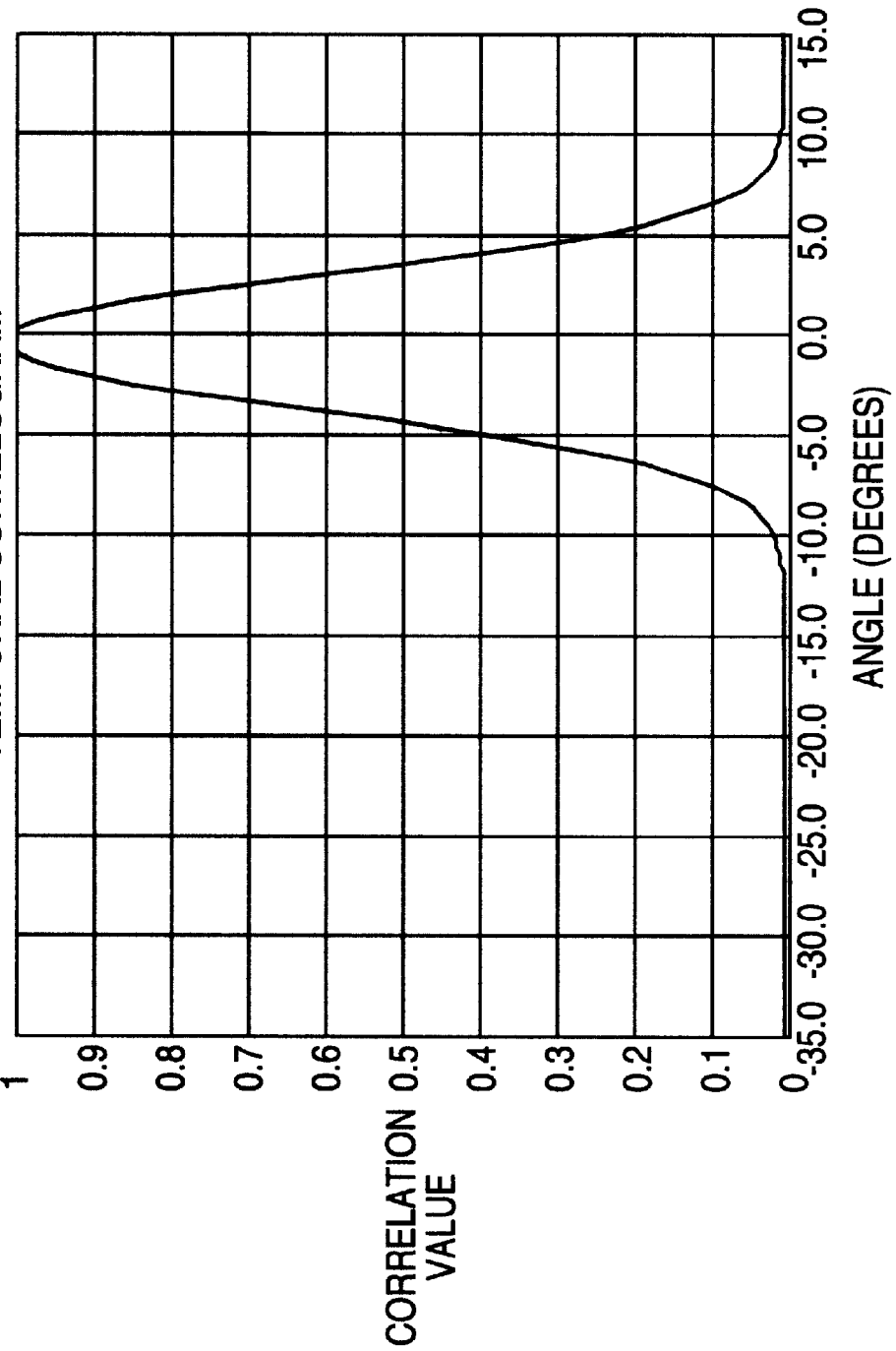

BI-DIRECTIONAL TEMPORAL CORRELATION SONAR

CROSS-REFERENCES(S) TO RELATED APPLICATION(S)

This application claims the benefit of U.S. Provisional Application Serial No. 60/449,402 filed Feb. 25, 2003, and which is incorporated herein by reference.

FIELD OF THE INVENTION

The present invention relates to temporal correlation SONAR systems.

BACKGROUND OF THE INVENTION

Correlation SONAR systems, which are based upon the principle of waveform invariance, transmit sonic pulses vertically downward towards an ocean bottom, detect echoes of those pulses, and calculate the velocity of a vessel based upon the distance traveled by the vessel between the transmission and reception of a first pulse and a second pulse.

Correlation SONAR systems may be water or ground speed based, and spatial or temporal based. A water SONAR device uses echoes reflected off the water beneath a vessel, whereas a ground speed SONAR device uses echoes reflected off an ocean bottom. Spatial correlation SONAR calculates the velocity of a vessel by transmitting two or more pulses towards an ocean bottom, receiving those pulses back on a planar two dimensional array of hydrophones, determining which two hydrophones correlate the best, and dividing the distance between those two hydrophones by twice the time differential between the pulses. A temporal correlation SONAR system transmits several pulses towards the ocean bottom, and receives the echoed waves at an array of two or more hydrophones. For a pair of hydrophones, the system determines which two pulses correlate the best, and calculates velocity by dividing the fixed distance between the hydrophones by twice the time differential between the two correlated pulses.

For maximum correlation to occur in a SONAR system, the ray path of an initial SONAR transmission towards an ocean bottom and its return to a hydrophone must equal the ray path of a second SONAR transmission towards the bottom and its return back to a possibly different hydrophone. As alluded to in the previous paragraph, the distance vector between the initial hydrophone and the later hydrophone for which there are equal ray paths provides the total distance traveled by a vessel between the times of the two transmissions and the times of receptions of two correlated pulses.

SUMMARY OF THE INVENTION

The present invention is a temporal correlation SONAR system that calculates the velocity and position of a vessel. A sonic transducer on the vessel transmits a first pulse towards an ocean bottom followed by a set of second pulses towards the ocean bottom. The reflection of these pulses is received at a tetrad of hydrophones located on the vessel. The system correlates the first pulse as received by a forward positioned hydrophone with one or more of the pulses in the second set as received by an aft-positioned hydrophone. This correlation produces correlation values that are input into a curve fitting algorithm. The peak of the resulting curve is determined, and the time associated with that peak is used to calculate an along-ship velocity of the vessel (by dividing the distance between the hydrophones by twice the time).

To calculate the athwart-ship velocity of the vessel, a temporal correlation is performed between both pairs of diagonally displaced hydrophones in the tetrad of hydrophones. The values from these two correlations are input into a curve fitting algorithm, and maximum correlation values at the peaks of the curves are determined. Thereafter, another curve is constructed using the maximum correlation values for both pairs of diagonally displaced hydrophones, and a maximum correlation value from the along-ship calculations. For this graph, the angle that each respective hydrophone pair makes with the along-ship axis is plotted on the abscissa, and the corresponding maximum correlation value for each pair is plotted on the ordinate. The value of the angle at the peak of this curve is used to calculate the athwart-ship velocity of the vessel (by multiplying the along-ship velocity by the tangent of the angle).

As such, the present invention is capable of producing a continuous stream of velocity data. This stream of data, in addition to providing the velocity, may be used as an alternative to Global Positioning Systems (GPS) to track the position of a vessel.

It is consequently an object of the present invention to calculate the velocity of a water navigable vessel with a temporal correlation SONAR system.

BRIEF DESCRIPTION OF THE DRAWINGS

FIG. 4 illustrates a correlogram showing a correlation between maximum correlation values from previous correlograms and the magnitude of angles that the pertinent hydrophone pairs make with the along-ship axis.

DETAILED DESCRIPTION OF THE INVENTION

Figure 1:
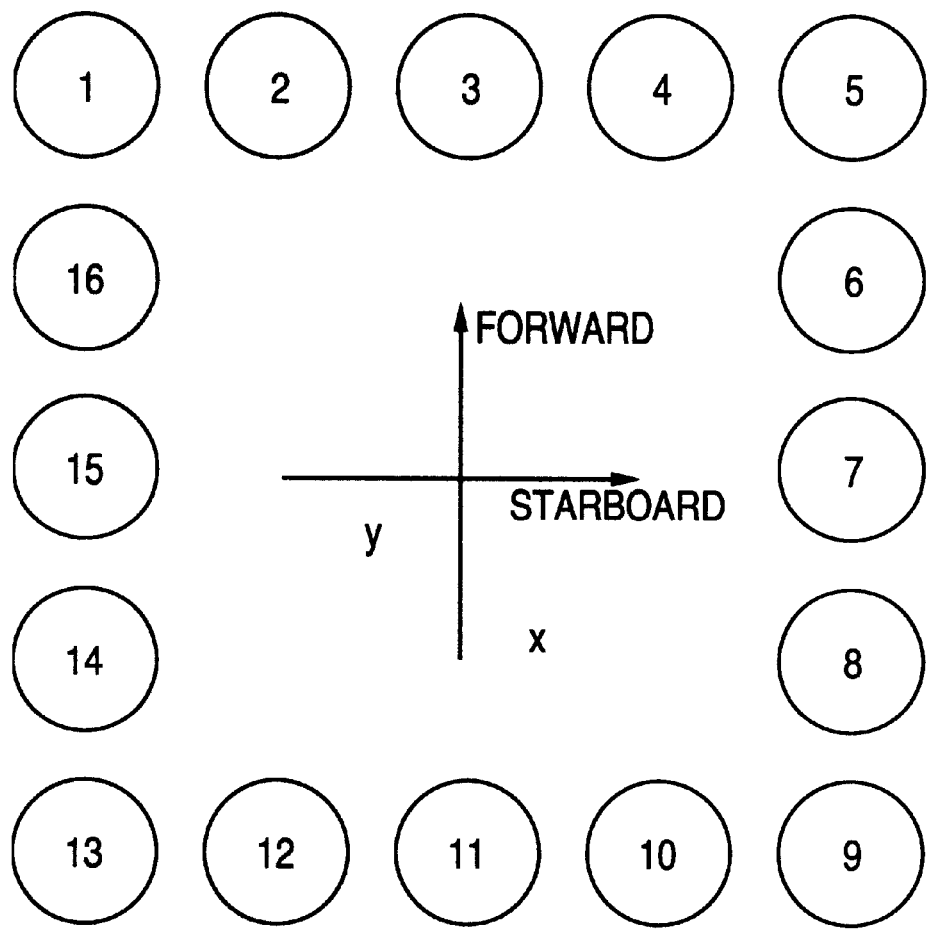
FIG. 1 illustrates a two dimensional hydrophone array consisting of sixteen hydrophones.
Figure 2:
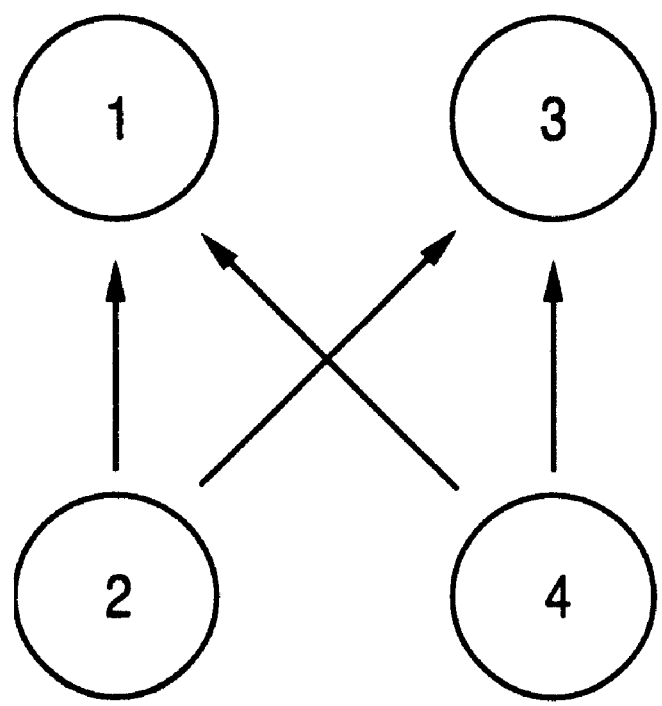
FIG. 2 illustrates a two dimensional hydrophone array consisting of four hydrophones.
Figure 2:
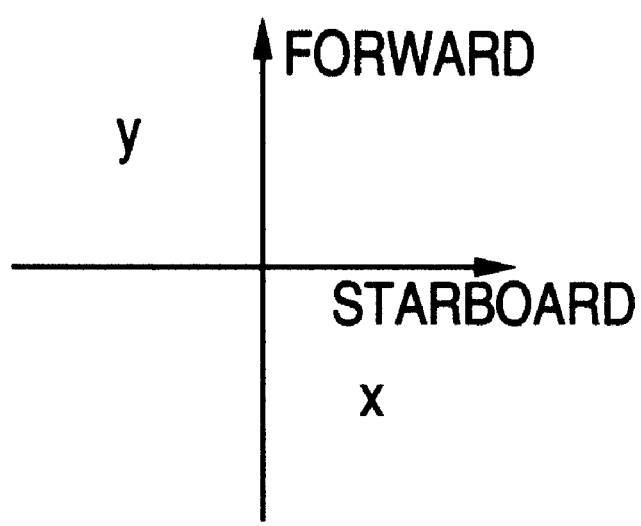

The present invention is a SONAR system that employs a two dimensional array of hydrophones. An example of such a hydrophone array with 16 hydrophones is illustrated in FIG. 1. In a preferred embodiment, the present invention uses one or more tetrads of hydrophones, such as the grouping of hydrophones (2, 3, 11, 12) or hydrophones (3, 4, 10, 11). For the purposes of describing the present invention, a two dimensional array of four hydrophones as illustrated in FIG. 2 will be used.

A sonic transducer on the bottom of a vessel transmits a single first pulse vertically downward towards an ocean bottom, followed by a set of second pulses also transmitted vertically downward towards the ocean bottom. The sonic transducer may be integral to one of the hydrophones, or it may be a stand alone device separate from the hydrophones. The sonic pulses may or may not be equally spaced, but the time differential between the first pulse and each pulse in the second set should be known. The pulses reflect off the ocean bottom (for a ground speed SONAR) or water beneath the vessel (for a water speed SONAR), return back to the vessel, and are sensed by a hydrophone tetrad located on the bottom of the vessel. Upon receipt of the return waves, temporal correlations are computed for each of the distance vectors between hydrophones 1 and 2, 3 and 4, 1 and 4, and 3 and 2. (See FIG. 2).

The receipt of the return waves by the hydrophones provides inphase and quadrature data that are used to correlate the first pulse with one or more of the pulses in the second set. In a preferred embodiment, the first pulse is correlated with each pulse from the second set. These correlations determine which echo return from the second set of pulses best correlates with the first pulse. On a forward moving vessel, the first pulse as it is received on hydrophone 1 is correlated with one or more of the pulses in the second set as they are received on hydrophone 2. (If the vessel is moving backwards, the correlation would be between the first pulse as received on hydrophone 2, and one or more of the pulses of the second set as received on hydrophone 1).

A correlation between the first pulse and a pulse from the second set produces a correlation point, which is a pair of numbers ($T_{ij}$, $C_{ij}$), where $T_{ij}$ is the time differential between the receipt of the first pulse on hydrophone 1 and the receipt of the $j^{th}$ pulse on hydrophone 2;

$C_{ij}$ is a correlation value between 0.0 and 1.0 that represents the degree of correlation between the first pulse and the $j^{th}$ pulse from the second set;

i is the pulse number of the first pulse; and j is the pulse number of the second pulse.

Correlation values are calculated as follows:

$$RE_{ij} = \sum_{l=1}^{ns} ((I_{ch2,l,j} * I_{ch1,l,i}) + (Q_{ch2,l,j} * Q_{ch1,l,i}))$$

$$IM_{ij} = \sum_{l=1}^{ns} ((I_{ch2,l,j} * Q_{ch1,l,i}) - (Q_{ch2,l,j} * I_{ch1,l,i})), \text{ where}$$

$I_{a,b,c}$ is the $b^{th}$ sample of inphase data for the received pulse c on hydrophone a;

$Q_{d,e,f}$ is the $e^{th}$ sample of quadrature data for the received pulse f on hydrophone d;

l is the sample number of inphase or quadrature data of the corresponding pulse; and ns is the number of inphase or quadrature samples to correlate.

After the calculation of the real and imaginary parts, the Pythagorean theorem is used to calculate actual correlation values as follows:

$$C_{ij} = \sqrt{RE_{ij}^2 + IM_{ij}^2}$$

In the above equation, $C_{ij}$ is a correlation value that indicates the degree of correlation between the first pulse and the $j^{th}$ pulse of the second set. Its value ranges from no or very little correlation (0.0) to a very high degree of correlation (1.0). In a preferred embodiment, a pair of ($T_{ij}$, $C_{ij}$) points is calculated for each pulse in the second set.

If there is a high correlation between the first pulse and a pulse from the second set, the ray paths of these two pulses from the vessel to their reflection points and then back to the vessel hydrophones are equal or very nearly equal. However, it is likely that there will not be one pulse from the second set of pulses that correlates exactly with the first pulse. Rather, two pulses from the second set may correlate nearly equally well with the first pulse, implying that the time it took the vessel to travel the distance which separates the two hydrophones between the transmit and receive times is not equal to the time differential between the first pulse and one of the pulses of the second set, but rather is equal to a time differential between the first pulse and two of the correlated second pulses.

Figure 3:
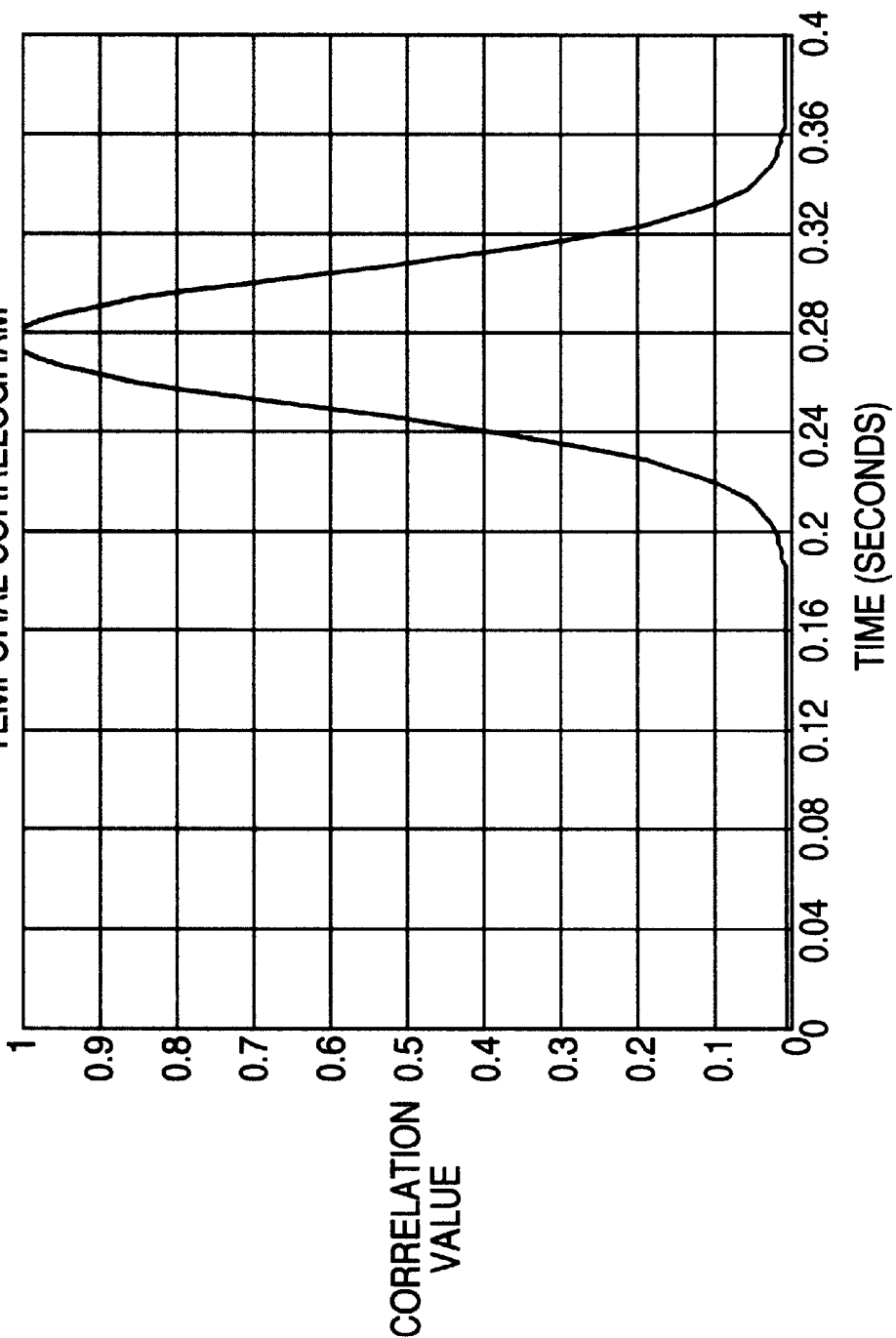
FIG. 3 illustrates a correlogram showing a correlation between a first pulse on a first hydrophone and a set of second pulses on a second hydrophone.

The $C_{ij}$ values resulting from correlating the first pulse as received by hydrophone 1 with the pulses in the second set as received by hydrophone 2 are input into a curve fitting algorithm, such as a Levenberg-Marquardt (LM) routine, to form a correlogram. As shown in FIG. 3, the correlogram is a plot of the $C_{ij}$ values versus the time differential between the pulses. The correlogram is searched to determine the time on the abscissa that corresponds to the peak amplitude of the correlogram on the ordinate. The time at the peak of the correlogram represents the most accurate measure of the time that it took the vessel to travel the distance between hydrophone 1 and hydrophone 2.

In similar fashion, values from correlating the first pulse as received by hydrophone 3 with one or more of the pulses from the second set as received by hydrophone 4 are input into a curve fitting algorithm to form a second correlogram. Although not necessary for the implementation of the present invention, this second correlation is generated in a preferred embodiment because the hydrophone configuration (i.e. a tetrad) allows for it, and its generation reduces the impact of noise in the measurement data by allowing a choice of the hydrophone pair that yields a maximum correlation. This second correlogram is searched to obtain the time at its peak amplitude. The two correlograms are then compared, and the time corresponding to the larger of the two peaks is used to calculate the along-ship velocity, $V_x$, as follows:

$$V_x = d/(2T)$$

where d is the distance between the two hydrophones (i.e., 1 and 2 or 3 and 4), and T is the time differential corresponding to the larger of the peaks of the two correlograms.

To calculate athwart-ship velocity, the results of a temporal correlation between the first pulse as received by hydrophone 1 and several or all pulses from the second set as received by hydrophone 4 are input into a curve fitting algorithm to form a corresponding correlogram. This correlogram is searched to determine its peak amplitude. However, unlike in the calculation of along-ship velocity where the time differential was extracted from the peak value of the curve (from the abscissa), in this instance, the maximum correlation value is extracted from the value of the ordinate at the curve's peak. Similarly, the results of a temporal correlation of a first pulse as received by hydrophone 3 and several or all of the pulses of the second set as received by hydrophone 2 are input into the curve fitting algorithm, and a maximum correlation value at the peak amplitude is determined.

These maximum correlation values for hydrophone pairs 1-4 and 3-2, the maximum correlation value associated with the larger peak of the two along-ship hydrophone pairs (i.e. 1-2 and 3-4), and the angles that each of these hydrophone pairs make with the along-ship axis, are input into the curve fitting algorithm. The algorithm fits these three points to a Gaussian curve (FIG. 4), and the angle on the abscissa that corresponds to the maximum correlation value on the ordinate as determined by the peak of the curve is the angle used to calculate the athwart-ship velocity, $V_y$, as follows:

$$V_y = V_x * \tan(\theta)$$

where $V_x$ is the along-ship velocity previously calculated, and $\theta$ is the angle derived from the peak of the curve.

An alternate means to calculate athwart-ship velocity involves first using the largest of the maximum correlation values for hydrophone pairs 1-4 and 3-2 to determine the direction of ship's velocity drift off along-ship (drift to port or starboard). That is, if the largest maximum correlation is for hydrophone pair 1-4 then the ship has a drift off along-ship in the starboard direction, and if the largest maximum is for hydrophone pair 3-2 then the ship has a drift off along-ship in the port direction. Then two non-linear equations with two unknowns are solved via a curve fitting or iterative technique to determine the athwart-ship velocity. The equations are as follows:

$$Vx = Vt^* \cos(\theta)$$

$$Va = Vt^* \cos(\Phi - \theta)$$

where:

$V_x$ is as previously defined;

Vt=total velocity of the ship;

Va=measured ship velocity in direction 1-4 or 3-2 (the direction with the largest maximum correlation);

$\Phi$=angle between a line connecting hydrophone pair 1-4 or 3-2 and the along ship axis; and $\theta$=angle of the true velocity as measured from the aft-forward direction.

The equations are then solved for $\theta$, yielding athwart-ship velocity, Vy, as follows:

$$V_y = V_x^* \tan(\theta).$$

The calculation of a vessel's velocity by the present invention may be used to monitor the position of the vessel. Such position monitoring by the present invention offers a degree of covertness not available with other positioning systems such as Global Positioning Systems (GPS). The increased covertness is due to the fact that there is no need for antenna exposure in the present invention. There is also no requirement for GPS satellite constellation coverage in the present invention. The present invention is therefore not susceptible to jamming as are other positioning systems. After an initial fix on the position of a vessel, the continuous velocity data stream produced by the present invention may be used to track and maintain the position of the vessel.

While the invention has been described in its preferred embodiment, it is to be understood that the words used are words of description rather than limitation and that changes may be made within the purview of the appended claims without departing from the true scope and spirit of the invention in its broader aspects.

What is claimed is:

1. A temporal correlation SONAR for a water navigable vessel comprising:

a first hydrophone;

a second hydrophone; and means to transmit a first sonic pulse and a set of second sonic pulses;

wherein said first pulse is received by said first hydrophone, and said set of second pulses is received by said second hydrophone;

wherein said first pulse is correlated with said set of second pulses, said correlation producing a set of first correlation values;

wherein each said first correlation value is associated with a time value, said time value representing an interval between said first pulse and pulses of said second set, said time values and said associated first correlation values forming a set of first correlation points;

wherein said set of first correlation points is input into a curve fitting algorithm, said curve fitting algorithm producing a first correlogram;

wherein said first correlogram is searched for a peak amplitude, said peak amplitude associated with a first peak time differential between said first pulse and said set of second pulses; and wherein a first velocity of said vessel is calculated by dividing a distance between said first hydrophone and said second hydrophone by twice said first peak time differential.

2. The temporal correlation SONAR according to claim 1, wherein said peak amplitude is associated with a first maximum correlation value.

3. The temporal correlation SONAR according to claim 1, wherein said first hydrophone and said second hydrophone are positioned along-ship.

4. The temporal correlation SONAR according to claim 1, wherein said first hydrophone and said second hydrophone are positioned athwart-ship.

5. The temporal correlation SONAR according to claim 1, wherein said curve fitting algorithm is a Levenberg-Marquardt routine.

6. The temporal correlation SONAR according to claim 1, wherein said first correlogram comprises an abscissa and an ordinate, and further wherein said time value is plotted on said abscissa, and said corresponding correlation value is plotted on said ordinate.

7. The temporal correlation SONAR according to claim 2, further comprising:

a third hydrophone; and a fourth hydrophone;

wherein said first, second, third and fourth hydrophones form a two dimensional array;

wherein said first pulse is received by said third hydrophone, and said set of second pulses is received by said fourth hydrophone;

wherein said first pulse as received by said third hydrophone is correlated with said set of second pulses as received by said fourth hydrophone, said correlation producing a set of second correlation values;

wherein each said second correlation value is associated with a time value, said time value representing an interval between said first pulse and pulses of said second set, said time values and said second correlation values forming a set of second correlation points;

wherein said set of second correlation points is input into a curve fitting algorithm, said curve fitting algorithm producing a second correlogram;

wherein said second correlogram is searched for a peak amplitude, said peak amplitude associated with a second peak time differential between said first pulse and said set of second pulses; and wherein a second velocity of said vessel is calculated by dividing a distance between said third hydrophone and said fourth hydrophone by twice said second peak time differential.

8. The temporal correlation SONAR according to claim 7, wherein said peak amplitude of said second correlogram is associated with a second maximum correlation value.

9. The temporal correlation SONAR according to claim 8, wherein said first pulse is received by said first hydrophone, and said set of second pulses is received by said fourth hydrophone;

wherein said first pulse as received by said first hydrophone is correlated with said set of second pulses as received by said fourth hydrophone, said correlation producing a set of third correlation values;

wherein each said third correlation value is associated with a time value, said time value representing an interval between said first pulse and pulses of said second set, said time values and said third correlation values forming a set of third correlation points;

wherein said set of third correlation points is input into a curve fitting algorithm, said curve fitting algorithm producing a third correlogram;

wherein said third correlogram is searched for a peak amplitude, said peak amplitude associated with a third maximum correlation value; and further wherein said first pulse is received by said third hydrophone, and said set of second pulses is received by said second hydrophone;

wherein said first pulse as received by said third hydrophone is correlated with said set of second pulses as received by said second hydrophone, said correlation producing a set of fourth correlation values;

wherein each said fourth correlation value is associated with a time value, said time value representing an interval between said first pulse and pulses of said second set, said time values and said fourth correlation values forming a set of fourth correlation points;

wherein said set of fourth correlation points is input into a curve fitting algorithm, said curve fitting algorithm producing a fourth correlogram;

wherein said fourth correlogram is searched for a peak amplitude, said peak amplitude associated with a fourth maximum correlation value; and further wherein said third maximum correlation value, said fourth maximum correlation value, said first maximum correlation value or said second maximum correlation value, and angles formed with an along-ship axis by said first and fourth hydrophones, said third and second hydrophones, and said first and second or said third and fourth hydrophones, are input into a curve fitting algorithm, said curve fitting algorithm producing a fifth correlogram;

wherein said fifth correlogram is searched for a peak amplitude, said peak amplitude associated with an angle; and wherein a third velocity of said vessel is calculated by multiplying said first velocity or said second velocity by the tangent of said angle at said peak amplitude of said fifth corelogram.

10. The temporal correlation SONAR according to claim 9, wherein said fifth correlogram is generated with the greater of said first maximum correlation value or said second maximum correlation value.

11. The temporal correlation SONAR according to claim 9, wherein said fifth correlogram comprises said angles plotted on an abscissa and said maximum correlation values plotted on an ordinate.

12. The temporal correlation SONAR according to claim 9, wherein said third velocity is calculated by multiplying the tangent of said angle by said first velocity, wherein said peak amplitude on said first correlogram is greater than said peak amplitude on said second correlogram.

13. The temporal correlation SONAR according to claim 2, further comprising:

a third hydrophone; and a fourth hydrophone;

wherein said first, second, third and fourth hydrophones form a two dimensional array;

wherein said first pulse is received by said first hydrophone, and said set of second pulses is received by said fourth hydrophone;

wherein said first pulse as received by said first hydrophone is correlated with said set of second pulses as received by said fourth hydrophone, said correlation producing a set of third correlation values;

wherein each said third correlation value is associated with a time value, said time value representing an interval between said first pulse and pulses of said second set, said time values and said third correlation values forming a set of third correlation points;

wherein said set of third correlation points is input into a curve fitting algorithm, said curve fitting algorithm producing a third correlogram;

wherein said third correlogram is searched for a peak amplitude, said peak amplitude associated with a third maximum correlation value; and further wherein said first pulse is received by said third hydrophone, and said set of second pulses is received by said second hydrophone;

wherein said first pulse as received by said third hydrophone is correlated with said set of second pulses as received by said second hydrophone, said correlation producing a set of fourth correlation values;

wherein each said fourth correlation value is associated with a time value, said time value representing an interval between said first pulse and pulses of said second set, said time values and said fourth correlation values forming a set of fourth correlation points;

wherein said set of fourth correlation points is input into a curve fitting algorithm, said curve fitting algorithm producing a fourth correlogram;

wherein said fourth correlogram is searched for a peak amplitude, said peak amplitude associated with a fourth maximum correlation value; and further wherein said third maximum correlation value, said fourth maximum correlation value, said first maximum correlation value, and angles formed with an along-ship axis by said first and fourth hydrophones, said third and second hydrophones, and said first and second hydrophones, are input into a curve fitting algorithm, said curve fitting algorithm producing a fifth correlogram;

wherein said fifth correlogram is searched for a peak amplitude, said peak amplitude associated with an angle; and wherein a third velocity of said vessel is calculated by multiplying said first velocity by the tangent of said angle at said peak amplitude of said fifth correlogram.

14. The temporal correlation SONAR according to claim 13, wherein said first velocity and said third velocity are used to calculate a position of said vessel.

15. The temporal correlation SONAR according to claim 9, wherein said third velocity and said first or second velocity are used to calculate a position of said vessel.

16. The temporal correlation SONAR according to claim 2, further comprising:

a third hydrophone; and a fourth hydrophone;

wherein said first, second, third and fourth hydrophones form a two dimensional array;

wherein said first pulse is received by said first hydrophone, and said set of second pulses is received by said fourth hydrophone;

wherein said first pulse as received by said first hydrophone is correlated with said set of second pulses as received by said fourth hydrophone, said correlation producing a set of third correlation values;

wherein each said third correlation value is associated with a time value, said time value representing an interval between said first pulse and pulses of said second set, said time values and said third correlation values forming a set of third correlation points;

wherein said set of third correlation points is input into a curve fitting algorithm, said curve fitting algorithm producing a third correlogram;

wherein said third correlogram is searched for a peak amplitude, said peak amplitude associated with a third maximum correlation value and a third peak time differential; and further wherein said first pulse is received by said third hydrophone, and said set of second pulses is received by said second hydrophone;

wherein said first pulse as received by said third hydrophone is correlated with said set of second pulses as received by said second hydrophone, said correlation producing a set of fourth correlation values;

wherein each said fourth correlation value is associated with a time value, said time value representing an interval between said first pulse and pulses of said second set, said time values and said fourth correlation values forming a set of fourth correlation points;

wherein said set of fourth correlation points is input into a curve fitting algorithm, said curve fitting algorithm producing a fourth correlogram;

wherein said fourth correlogram is searched for a peak amplitude, said peak amplitude associated with a fourth maximum correlation value and a fourth peak time differential; and further wherein a direction of said vessel off an along-ship axis is determined by the greater of said third correlation value or said fourth correlation value; and further wherein non-linear equations $$V_x = V_t * \cos(\theta)$$
$$V_a = V_t * \cos(\Phi - \theta)$$

are solved for $\theta$;

wherein $V_x$ is said first velocity;

wherein $V_t$ is a total velocity of said vessel;

wherein $V_a$ is a measured velocity of said vessel along a vector formed by said first and fourth hydrophones or a vector formed by said third and second hydrophones, said vector determined by the greater of said third maximum correlation value or said fourth maximum correlation value, said measured velocity determined by dividing a length of said vector by twice said third peak time differential or twice said fourth peak time differential, said third peak time differential or said fourth peak time differential determined by the greater of said third maximum correlation value or said fourth maximum correlation value;

wherein $\Phi$ is an angle formed by said first and fourth hydrophones with an along-ship axis or said third and second hydrophones with said along-ship axis, wherein $\Phi$ is determined by the greater of said third correlation value or said fourth correlation value; and wherein $\theta$ is an angle of said total velocity as measured from said along-ship axis; and further wherein a third velocity is calculated by multiplying said first velocity by the tangent of $\theta$.

17. A process to determine a velocity of a water navigable vessel, comprising the steps of:

detecting a first sonic pulse on a first hydrophone;

detecting a set of second sonic pulses on a second hydrophone;

correlating said first pulse with several of said second pulses, said correlation producing correlation values, wherein each said correlation value is associated with a time value, said time value representing an interval between said first pulse and pulses of said second set, said time values and said correlation values forming a set of first correlation points;

inputting said correlation points into a curve fitting algorithm, said curve fitting algorithm producing a curve with a peak amplitude, said peak amplitude corresponding to a peak time differential between said first pulse and said set of second pulses; and calculating a first velocity by dividing a distance between said first hydrophone and said second hydrophone by twice said peak time differential.

18. The process to determine a velocity of a water navigable vessel according to claim 17, wherein said peak amplitude further corresponds to a first maximum correlation value.

19. The process to determine a velocity of a water navigable vessel according to claim 18, further comprising the steps of:

detecting said first sonic pulse on a third hydrophone;

detecting said set of second pulses on a fourth hydrophone, said first, second, third, and fourth hydrophones forming a two-dimensional array;

correlating said first sonic pulse as received by said third hydrophone with several of said second sonic pulses as received by said fourth hydrophone, said correlation producing a set of second correlation values, wherein each said second correlation value is associated with a time value, said time value representing an interval between said first pulse and pulses of said second set, said time values and said second correlation values forming a set of second correlation points;

inputting said second correlation points into said curve fitting algorithm, said curve fitting algorithm producing a second curve with a peak value, said peak value corresponding to a second peak time differential; and calculating a second velocity by dividing a distance between said third hydrophone and said fourth hydrophone by twice said second peak time differential.

20. The process to determine a velocity of a water navigable vessel according to claim 19, wherein said peak value of said second curve further corresponds to a second maximum correlation value.

21. The process to determine a velocity of a water navigable vessel according to claim 20, further comprising the steps of:

detecting said first sonic pulse on said first hydrophone;

detecting said set of second pulses on said fourth hydrophone;

correlating said first sonic pulse as received by said first hydrophone with several of said second sonic pulses as received by said fourth hydrophone, said correlation producing a set of third correlation values, wherein each said third correlation value is associated with a time value, said time value representing an interval between said first pulse and pulses of said second set, said time values and said third correlation values forming a set of third correlation points;

inputting said set of third correlation points into said curve fitting algorithm, said curve fitting algorithm producing a third curve with a peak value, said peak value corresponding to a third maximum correlation value; and further comprising the steps of:

detecting said first sonic pulse on said third hydrophone;

detecting said set of second pulses on said second hydrophone;

correlating said first sonic pulse as received by said third hydrophone with several of said second sonic pulses as received by said second hydrophone, said correlation producing a set of fourth correlation values, wherein each said fourth correlation value is associated with a time value, said time value representing an interval between said first pulse and pulses of said second set, said time values and said fourth correlation values forming a set of fourth correlation points;

inputting said set of fourth correlation points into said curve fitting algorithm, said curve fitting algorithm producing a fourth curve with a peak value, said peak value corresponding to a fourth maximum correlation value; and further comprising the steps of:

inputting into said curve fitting algorithm said third maximum correlation value, said fourth maximum correlation value, the larger of said first maximum correlation value or said second maximum correlation value, and angles formed with an along-ship axis by said first and fourth hydrophones, said third and second hydrophones, and said first and second or said third and fourth hydrophones, said curve fitting algorithm producing a fifth curve;

searching said fifth curve for a peak amplitude, said peak amplitude associated with an angle; and calculating a third velocity of said vessel by multiplying said first velocity or said second velocity by the tangent of said angle at said peak amplitude of said fifth curve.

22. The process to determine a velocity of a water navigable vessel according to claim 21, wherein said correlations comprise the steps of:

calculating a real value as defined by $$RE_{ij} = \sum_{l=1}^{ns} ((I_{ch2,l,j} * I_{ch1,l,i}) + (Q_{ch2,l,j} * Q_{ch1,l,i}))$$

calculating an imaginary value as defined by $$IM_{ij} = \sum_{l=1}^{ns} ((I_{ch2,l,j} * Q_{ch1,l,i}) - (Q_{ch2,l,j} * I_{ch1,l,i})), \text{ wherein}$$

$I_{a,b,c}$ is an $b^{th}$ sample of inphase data for a received pulse c on hydrophone a;

$Q_{d,e,f}$ is an $e^{th}$ sample of quadrature data for a received pulse f on hydrophone d;

l is the sample number of inphase or quadrature data of a corresponding pulse; and ns is a number of inphase or quadrature samples to correlate; and calculating a correlation value as defined by $C_{ij} = \sqrt{RE_{ij}^2 + IM_{ij}^2}$.

23. The process to determine a velocity of a water navigable vessel according to claim 18, further comprising the steps of:

detecting said first sonic pulse on said first hydrophone;

detecting said set of second pulses on a fourth hydrophone;

correlating said first sonic pulse as received by said first hydrophone with several of said second sonic pulses as received by said fourth hydrophone, said correlation producing a set of third correlation values, wherein each said third correlation value is associated with a time value, said time value representing an interval between said first pulse and pulses of said second set, said time values and said third correlation values forming a set of third correlation points;

inputting said set of third correlation points into said curve fitting algorithm, said curve fitting algorithm producing a third curve with a peak value, said peak value corresponding to a third maximum correlation value; and further comprising the steps of:

detecting said first sonic pulse on a third hydrophone;

detecting said set of second pulses on said second hydrophone, wherein said first, second, third and fourth hydrophones form a two dimensional array;

correlating said first sonic pulse as received by said third hydrophone with several of said second sonic pulses as received by said second hydrophone, said correlation producing a set of fourth correlation values, wherein each said fourth correlation value is associated with a time value, said time value representing an interval between said first pulse and pulses of said second set, said time values and said fourth correlation values forming a set of fourth correlation points;

inputting said set of fourth correlation points into said curve fitting algorithm, said curve fitting algorithm producing a fourth curve with a peak value, said peak value corresponding to a fourth maximum correlation value; and further comprising the steps of:

inputting into said curve fitting algorithm said third maximum correlation value, said fourth maximum correlation value, said first maximum correlation value, and angles formed with an along-ship axis by said first and fourth hydrophones, said third and second hydrophones, and said first and second hydrophones, said curve fitting algorithm producing a fifth curve;

searching said fifth curve for a peak amplitude, said peak amplitude associated with an angle; and calculating a third velocity of said vessel by multiplying said first velocity by the tangent of said angle at said peak amplitude of said fifth curve.

24. The process to determine a velocity of a water navigable vessel according to claim 23, wherein said first velocity and said third velocity are used to calculate a position of said vessel.

25. The process to determine a velocity of a water navigable vessel according to claim 20, wherein said third velocity and said first or said second velocity are used to calculate a position of said vessel.

26. The process to determine a velocity of a water navigable vessel according to claim 18, further comprising the steps of:

detecting said first sonic pulse on said first hydrophone;

detecting said set of second pulses on a fourth hydrophone;

correlating said first sonic pulse as received by said first hydrophone with several of said second sonic pulses as received by said fourth hydrophone, said correlation producing a set of third correlation values, wherein each said third correlation value is associated with a time value, said time value representing an interval between said first pulse and pulses of said second set, said time values and said third correlation values forming a set of third correlation points;

inputting said set of third correlation points into said curve fitting algorithm, said curve fitting algorithm producing a third curve with a peak value, said peak value corresponding to a third maximum correlation value; and further comprising the steps of:

detecting said first sonic pulse on a third hydrophone;

detecting said set of second pulses on said second hydrophone, wherein said first, second, third and fourth hydrophones form a two dimensional array;

correlating said first sonic pulse as received by said third hydrophone with several of said second sonic pulses as received by said second hydrophone, said correlation producing a set of fourth correlation values, wherein each said fourth correlation value is associated with a time value, said time value representing an interval between said first pulse and pulses of said second set, said time values and said fourth correlation values forming a set of fourth correlation points;

inputting said set of fourth correlation points into said curve fitting algorithm, said curve fitting algorithm producing a fourth curve with a peak value, said peak value corresponding to a fourth maximum correlation value; and further comprising the steps of:

determining a direction of said vessel off an along-ship axis by the greater of said third maximum correlation value or said fourth maximum correlation value; and further comprising the step of calculating a third velocity by solving the following non-linear equations $$V_x = V_t * \cos(\theta)$$

$$V_a = V_t * \cos(\Phi - \theta)$$

for $\theta$, and multiplying said first velocity by the tangent of $\theta$;

wherein $V_x$ is said first velocity;

wherein $V_t$ is a total velocity of said vessel;

wherein $V_a$ is a measured velocity of said vessel along a vector formed by said first and fourth hydrophones or a vector formed by said third and second hydrophones, said vector determined by the greater of said third maximum correlation value or said fourth maximum correlation value, said measured velocity determined by dividing a length of said vector by twice said third peak time differential or twice said fourth peak time differential, said third peak time differential or said fourth peak time differential determined by the greater of said third maximum correlation value or said fourth maximum correlation value;

wherein $\Phi$ is an angle formed by said first and fourth hydrophones with an along-ship axis or said third and second hydrophones with said along-ship axis, wherein $\Phi$ is determined by the greater of said third maximum correlation value or said fourth maximum correlation value; and wherein $\theta$ is an angle of said total velocity as measured from said along-ship axis.

27. A computer readable storage medium, said medium comprising instructions to:

transmit a first sonic pulse towards an ocean bottom;

transmit a set of second sonic pulses towards said ocean bottom;

detect an echo of said first pulse on a first hydrophone;

detect echoes of said second pulses on a second hydrophone;

correlate said first pulse with several of said second pulses, said correlation producing a set of first correlation values, wherein each said first correlation value is associated with a time value, said time value representing an interval between said first pulse and pulses of said second set, said time values and said first correlation values forming a set of first correlation points;

plot said first correlation points on a first correlogram, said first correlogram comprising said time differential on an abscissa and said first correlation values on an ordinate;

determine a peak value of said first correlogram, and further determine a corresponding time value on said abscissa of said first correlogram; and calculate a first velocity of a vessel by dividing a distance between said first hydrophone and said second hydrophone by twice said time value.

28. The computer readable storage medium according to claim 27, wherein said peak value of said first correlogram further provides a first maximum correlation value.

29. The computer readable storage medium according to claim 28, further comprising instructions to:

detect an echo of said first pulse on a third hydrophone;

detect echoes of said second pulses on a fourth hydrophone, said first, second, third, and fourth hydrophones forming a two dimensional array;

correlate said first pulse as received by said third hydrophone with several of said second pulses as received by said fourth hydrophone, said correlation producing a set of second correlation values, wherein each said second correlation value is associated with a time value, said time value representing an interval between said first pulse and pulses of said second set, said time values and said second correlation values forming a set of second correlation points;

plot said second correlation points on a second correlogram, said second correlogram comprising a time value on an abscissa of said second correlogram and said second correlation values on an ordinate of said second correlogram;

determine a peak value for said second correlogram, and further determine a corresponding time value on said abscissa of said second correlogram; and calculate a second velocity for said vessel by dividing a distance between said third and said fourth hydrophones by twice said corresponding time value from said abscissa of said second correlogram.

30. The computer readable storage medium according to claim 29, wherein said peak value for said second correlogram further provides a second maximum correlation value.

31. The computer readable storage medium according to claim 30, further comprising instructions to:

detect an echo of said first pulse on said first hydrophone;

detect echoes of said second pulses on said fourth hydrophone;

correlate said first pulse as received by said first hydrophone with several of said second pulses as received by said fourth hydrophone, said correlation producing a set of third correlation values, wherein each said third correlation value is associated with a time value, said time value representing an interval between said first pulse and pulses of said second set, said time values and said third correlation values forming a set of third correlation points;

plot said third correlation points on a third correlogram, said third correlogram comprising a time value on an abscissa of said third correlogram and said third correlation values on an ordinate of said third correlogram;

determine a peak value for said third correlogram, and further determine a third maximum correlation value on said ordinate associated with said peak value; and further comprising instructions to:

detect an echo of said first pulse on said third hydrophone;

detect echoes of said second pulses on said second hydrophone;

correlate said first pulse as received by said third hydrophone with several of said second pulses as received by said second hydrophone, said correlation producing a set of fourth correlation values, wherein each said fourth correlation value is associated with a time value, said time value representing an interval between said first pulse and pulses of said second set, said time values and said fourth correlation values forming a set of fourth correlation points;

plot said fourth correlation points on a fourth correlogram, said fourth correlogram comprising a time value on an abscissa of said fourth correlogram and said fourth correlation values on an ordinate of said fourth correlogram;

determine a peak of said fourth correlogram, and further determine a fourth maximum correlation value on said ordinate associated with said peak value; and further comprising instructions to:

generate a fifth correlogram, said fifth correlogram comprising said third maximum correlation value, said fourth maximum correlation value, said first or second maximum correlation value, and angles formed with an along-ship axis by said first and fourth hydrophones, said third and second hydrophones, and said first and second hydrophones or said third and fourth hydrophones;

determine a peak value of said fifth correlogram, and further determine an angle from said abscissa corresponding to said peak value; and calculate a third velocity of said vessel by multiplying said first velocity or said second velocity by the tangent of said angle at said peak amplitude of said fifth correlogram.

32. The computer readable storage medium according to claim 28, further comprising instructions to:

detect an echo of said first pulse on said first hydrophone;

detect echoes of said second pulses on a fourth hydrophone;

correlate said first pulse as received by said first hydrophone with several of said second pulses as received by said fourth hydrophone, said correlation producing a set of third correlation values, wherein each said third correlation value is associated with a time value, said time value representing an interval between said first pulse and pulses of said second set, said time values and said third correlation values forming a set of third correlation points;

plot said third correlation points on a third correlogram, said third correlogram comprising a time value on an abscissa of said third correlogram and said third correlation values on an ordinate of said third correlogram;

determine a peak value for said third correlogram, and further determine a third maximum correlation value on said ordinate associated with said peak value; and further comprising instructions to:

detect an echo of said first pulse on a third hydrophone;

detect echoes of said second pulses on said second hydrophone, wherein said first, second, third and fourth hydrophones form a two dimensional array;

correlate said first pulse as received by said third hydrophone with several of said second pulses as received by said second hydrophone, said correlation producing a set of fourth correlation values, wherein each said fourth correlation value is associated with a time value, said time value representing an interval between said first pulse and pulses of said second set, said time values and said fourth correlation values forming a set of fourth correlation points;

plot said fourth correlation points on a fourth correlogram, said fourth correlogram comprising a time value on an abscissa of said fourth correlogram and said fourth correlation values on an ordinate of said fourth correlogram;

determine a peak of said fourth correlogram, and further determine a fourth maximum correlation value on said ordinate associated with said peak value; and further comprising instructions to:

generate a fifth correlogram, said fifth correlogram comprising said third maximum correlation value, said fourth maximum correlation value, said first maximum correlation value, and angles formed with an along-ship axis by said first and fourth hydrophones, said third and second hydrophones, and said first and second hydrophones;

determine a peak value of said fifth correlogram, and further determine an angle from said abscissa corresponding to said peak value; and calculate a third velocity of said vessel by multiplying said first velocity by the tangent of said angle at said peak value of said fifth correlogram.

33. The computer readable storage medium according to claim 31, wherein said third velocity and said first or said second velocity are used to calculate a position of said vessel.

34. The computer readable storage medium according to claim 32, wherein said first velocity and said third velocity are used to calculate a position of said vessel.

35. The computer readable storage medium according to claim 28, further comprising instructions to:

detect an echo of said first pulse on said first hydrophone;

detect echoes of said second pulses on a fourth hydrophone;

correlate said first pulse as received by said first hydrophone with several of said second pulses as received by said fourth hydrophone, said correlation producing a set of third correlation values, wherein each said third correlation value is associated with a time value, said time value representing an interval between said first pulse and pulses of said second set, said time values and said third correlation values forming a set of third. correlation points;

plot said third correlation points on a third correlogram, said third correlogram comprising a time value on an abscissa of said third correlogram and said third correlation values on an ordinate of said third correlogram;

determine a peak value for said third correlogram, and further determine a third maximum correlation value on said ordinate associated with said peak value and a third peak time differential on said abscissa associated with said peak value; and further comprising instructions to:

detect an echo of said first pulse on a third hydrophone;

detect echoes of said second pulses on said second hydrophone, wherein said first, second, third and fourth hydrophones form a two dimensional array;

correlate said first pulse as received by said third hydrophone with several of said second pulses as received by said second hydrophone, said correlation producing a set of fourth correlation values, wherein each said fourth correlation value is associated with a time value, said time value representing an interval between said first pulse and pulses of said second set, said time values and said fourth correlation values forming a set of fourth correlation points;

plot said fourth correlation points on a fourth correlogram, said fourth correlogram comprising a time value on an abscissa of said fourth correlogram and said fourth correlation values on an ordinate of said fourth correlogram;

determine a peak of said fourth correlogram, and further determine a fourth maximum correlation value on said ordinate associated with said peak value and a fourth peak time differential on said abscissa associated with said peak value; and further comprising instructions to:

determine a direction of said vessel off an along-ship axis by the greater of said third maximum correlation value or said fourth maximum correlation value; and further comprising instructions to calculate a third velocity by solving the following non-linear equations $V_x = V_t * \cos(\theta)$ $V_a = V_t * \cos(\Phi - \theta)$ for θ, and multiplying said first velocity by the tangent of θ;

wherein $V_x$ is said first velocity;

wherein $V_t$ is a total velocity of said vessel;

wherein $V_a$ is a measured velocity of said vessel along a vector formed by said first and fourth hydrophones or a vector formed by said third and second hydrophones, said vector determined by the greater of said third maximum correlation value or said fourth maximum correlation value, said measured velocity determined by dividing a length of said vector by twice said third peak time differential or twice said fourth peak time differential, said third peak time differential or said fourth peak time differential determined by the greater of said third maximum correlation value or said fourth maximum correlation value;

wherein Φ is an angle formed by said first and fourth hydrophones with an along-ship axis or said third and second hydrophones with said along-ship axis, wherein Φ is determined by the greater of said third maximum correlation value or said fourth maximum correlation value; and wherein θ is an angle of said total velocity as measured from said along-ship axis.

36. A temporal correlation SONAR for a water navigable vessel comprising:

means to transmit a first sonic pulse;

means to transmit a set of second sonic pulses;

a first means to detect an echo of said first sonic pulse;

a second means to detect echoes of said second sonic pulses;

means to correlate said first pulse with said second pulses, said correlation producing a set of first correlation values, wherein each said first correlation value is associated with a time value, said time value representing an interval between said first pulse and pulses of said second set, said time values and said first correlation values forming a set of first correlation points;

means of generating a first correlogram from said first correlation points;

means of searching said first correlogram for a peak amplitude, said peak amplitude associated with a first peak time differential between said first pulse and said set of second pulses; and means to calculate a first velocity of said vessel by dividing a distance between said first means and said second means by twice said first peak time differential.

37. The temporal correlation SONAR according to claim 36, wherein said peak amplitude of said first correlogram is further associated with a first maximum correlation value.

38. The temporal correlation SONAR according to claim 37, further comprising:

a third means to detect an echo of said first sonic pulse;

a fourth means to detect echoes of said second sonic pulses, wherein said first, second, third and fourth means form a two dimensional array;

means to correlate said first pulse as received by said third means with said second pulses as received by said fourth means, said correlation producing a set of second correlation values, wherein each said second-correlation value is associated with a time value, said time value representing an interval between said first pulse and pulses of said second set, said time values and said second correlation values forming a set of second correlation points;

means of generating a second correlogram from said second correlation points;

means of searching said second correlogram for a peak amplitude, said peak amplitude associated with a second peak time differential between said first pulse and said set of second pulses; and means to calculate a second velocity of said vessel by dividing a distance between said third means and said fourth means by twice said second peak time differential.

39. The temporal correlation SONAR according to claim 38, wherein said peak amplitude of said second correlogram is further associated with a second maximum correlation value.

40. The temporal correlation SONAR according to claim 39, further comprising:

means to correlate said first pulse as received by said first means with said second pulses as received by said fourth means, said correlation producing a set of third correlation values, wherein each said third correlation value is associated with a time value, said time value representing an interval between said first pulse and pulses of said second set, said time values and said third correlation values forming a set of third correlation points;

means of generating a third correlogram from said third correlation points;

means of searching said third correlogram for a peak amplitude, said peak amplitude associated with a third maximum correlation value; and further comprising:

means to correlate said first pulse as received by said third means with said second pulses as received by said second means, said correlation producing a set of fourth correlation values, wherein each said fourth correlation value is associated with a time value, said time value representing an interval between said first pulse and pulses of said second set, said time values and said fourth correlation values forming a set of fourth correlation points;

means of generating a fourth correlogram from said fourth correlation points;

means of searching said fourth correlogram for a peak amplitude, said peak amplitude associated with a fourth maximum correlation value; and further comprising:

means of generating a fifth correlogram, said fifth correlogram comprising said third maximum correlation value, said fourth maximum correlation value, the greater of said first or said second maximum correlation values, and angles formed with an along-ship axis by said first and said fourth means, said third and said second means, and said first and second means or said third and fourth means;

means for determining a peak amplitude from said fifth correlogram, said peak amplitude corresponding to an angle; and means to calculate a third velocity of said vessel by multiplying said first velocity or said second velocity by the tangent of said angle at said peak amplitude of said fifth correlogram.

41. The temporal correlation SONAR according to claim 37, further comprising:

a third means to detect an echo of said first sonic pulse;

a fourth means to detect echoes of said second sonic pulses, wherein said first means, said second means, said third means, and said fourth means comprise a two dimensional array;

means to correlate said first pulse as received by said first means with said second pulses as received by said fourth means, said correlation producing a set of third correlation values, wherein each said third correlation value is associated with a time value, said time value representing an interval between said first pulse and pulses of said second set, said time values and said third correlation values forming a set of third correlation points;

means of generating a third correlogram from said third correlation points;

means of searching said third correlogram for a peak amplitude, said peak amplitude associated with a third maximum correlation value; and further comprising:

means to correlate said first pulse as received by said third means with said second pulses as received by said second means, said correlation producing a set of fourth correlation values, wherein each said fourth correlation value is associated with a time value, said time value representing an interval between said first pulse and pulses of said second set, said time values and said fourth correlation values forming a set of fourth correlation points;

means of generating a fourth correlogram from said fourth correlation points;

means of searching said fourth correlogram for a peak amplitude, said peak amplitude associated with a fourth maximum correlation value; and further comprising:

means of generating a fifth correlogram, said fifth correlogram comprising said third maximum correlation value, said fourth maximum correlation value, said first maximum correlation value, and angles formed with an along-ship axis by said first and said fourth means, said third and said second means, and said first and second means;

means for determining a peak amplitude from said fifth correlogram, said peak amplitude corresponding to an angle; and means to calculate a third velocity of said vessel by multiplying said first velocity by the tangent of said angle at said peak amplitude of said fifth correlogram.

42. The temporal correlation SONAR according to claim 40, wherein said third velocity and said first or said second velocity are used to determine a position of said vessel.

43. The temporal correlation SONAR according to claim 41, wherein said first velocity and said third velocity are used to calculate a position of said vessel.

44. The temporal correlation SONAR according to claim 37, further comprising:

a third means to detect an echo of said first sonic pulse;

a fourth means to detect echoes of said second sonic pulses, wherein said first means, said second means, said third means, and said fourth means comprise a two dimensional array;

means to correlate said first pulse as received by said first means with said second pulses as received by said fourth means, said correlation producing a set of third correlation values, wherein each said third correlation value is associated with a time value, said time value representing an interval between said first pulse and pulses of said second set, said time values and said third correlation values forming a set of third correlation points;

means of generating a third correlogram from said third correlation points;

means of searching said third correlogram for a peak amplitude, said peak amplitude associated with a third maximum correlation value and a third peak time differential; and further comprising:

means to correlate said first pulse as received by said third means with said second pulses as received by said second means, said correlation producing a set of fourth correlation values, wherein each said fourth correlation value is associated with a time value, said time value representing an interval between said first pulse and pulses of said second set, said time values and said fourth correlation values forming a set of fourth correlation points;

means of generating a fourth correlogram from said fourth correlation points;

means of searching said fourth correlogram for a peak amplitude, said peak amplitude associated with a fourth maximum correlation value and a fourth peak time differential; and further comprising:

means to determine a direction of said vessel off an along-ship axis by the greater of said third maximum correlation value or said fourth maximum correlation value; and further comprising means to calculate a third velocity by solving the following non-linear equations $V_x = V_t * \cos(\theta)$ $V_a = V_t * \cos(\Phi - \theta)$ for θ, and multiplying said first velocity by the tangent of θ;

wherein $V_x$ is said first velocity;

wherein $V_t$ is a total velocity of said vessel;

wherein $V_a$ is a measured velocity of said vessel along a vector formed by said first and fourth hydrophones or a vector formed by said third and second hydrophones, said vector determined by the greater of said third maximum correlation value or said fourth maximum correlation value, said measured velocity determined by dividing a length of said vector by twice said third peak time differential or twice said fourth peak time differential, said third peak time differential or said fourth peak time differential determined by the greater of said third maximum correlation value or said fourth maximum correlation value;

wherein Φ is an angle formed by said first and fourth hydrophones with an along-ship axis or said third and second hydrophones with said along-ship axis, wherein Φ determined by the greater of said third maximum correlation value or said fourth maximum correlation value; and wherein θ is an angle of said total velocity as measured from said along-ship axis.

* * * * *